US009169162B2

(12) United States Patent
Rhoads (10) Patent No.: US 9,169,162 B2
(45) Date of Patent: Oct. 27, 2015

(54) LARGE REFRACTORY ARTICLE AND METHOD FOR MAKING

(75) Inventor: Randy L. Rhoads, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 800 days.

(21) Appl. No.: 13/363,589

(22) Filed: Feb. 1, 2012

(65) Prior Publication Data

US 2012/0133088 A1      May 31, 2012

Related U.S. Application Data

(62) Division of application No. 12/704,897, filed on Feb. 12, 2010, now abandoned.

(60) Provisional application No. 61/153,679, filed on Feb. 19, 2009.

(51) Int. Cl.
| C04B 35/64 | (2006.01) |
| C04B 35/48 | (2006.01) |
| C03B 17/06 | (2006.01) |
| C04B 35/447 | (2006.01) |

(52) U.S. Cl.
CPC .............. *C04B 35/481* (2013.01); *C03B 17/064* (2013.01); *C04B 35/447* (2013.01); *C04B 2235/3225* (2013.01); *C04B 2235/77* (2013.01); *C04B 2235/94* (2013.01); *C04B 2235/9623* (2013.01)

(58) Field of Classification Search
CPC .............................................. C04B 2235/9623

USPC ........................................ 264/607, 671–673
See application file for complete search history.

(56) References Cited

U.S. PATENT DOCUMENTS

| 3,904,352 A | * | 9/1975 | Thurnauer et al. ................. 432/5 |
| 4,717,535 A | | 1/1988 | Adlerborn et al. ............... 419/38 |
| 4,778,650 A | | 10/1988 | Hermansson et al. ........... 419/38 |
| 4,952,353 A | | 8/1990 | Neil ................................ 264/65 |
| 5,080,843 A | | 1/1992 | Larker et al. ..................... 264/62 |

(Continued)

FOREIGN PATENT DOCUMENTS

| JP | 2008/184337 | 1/2007 |
| TW | 200535114 | 11/2005 |

(Continued)

OTHER PUBLICATIONS

Taiwan Search Report dated Jan. 15, 2013 relating to TW Patent Application No. 099104916 filed Feb. 12, 2010.

*Primary Examiner* — Erin Snelting
(74) *Attorney, Agent, or Firm* — Kevin M. Able (57) ABSTRACT

A method of sintering large refractory ceramic articles is disclosed. The method includes supporting a green refractory body on a plurality of support plates, the support plates in turn being supported by a plurality of support members having arcuate upper and lower surfaces. A setter material is disposed between the green refractory body to be sintered and the support plates. As the refractory body is sintered, the density of the article increases. Concurrently, the dimensions of the body decrease, which shrinkage, unless otherwise accommodated, may cause fracture of the body. The support plates and the structure of the support members, move to prevent the development of detrimental stresses in the refractory body as it sinters.

21 Claims, 5 Drawing Sheets

(56) References Cited

U.S. PATENT DOCUMENTS

| | | | |
|---|---|---|---|
| 5,089,197 A | 2/1992 | Butler et al. | 264/65 |
| 5,128,074 A | 7/1992 | Steel et al. | |
| 6,706,428 B2 | 3/2004 | Kobayashi et al. | |
| 6,974,786 B2 | 12/2005 | Helfinstine et al. | 501/106 |
| 7,238,635 B2 | 7/2007 | Ames et al. | 501/106 |
| 7,928,029 B2 | 4/2011 | Addiego et al. | |
| 7,939,459 B2 | 5/2011 | Lynker | 501/120 |
| 8,067,326 B2 | 11/2011 | Godard et al. | 501/152 |
| 2004/0055338 A1* | 3/2004 | Helfinstine et al. | 65/374.13 |
| 2006/0082033 A1 | 4/2006 | Hauptmann et al. | 264/605 |
| 2008/0125307 A1 | 5/2008 | Lu et al. | |
| 2008/0196449 A1 | 8/2008 | Addiego et al. | 65/17.3 |
| 2009/0131241 A1 | 5/2009 | Godard et al. | 501/106 |
| 2010/0016146 A1 | 1/2010 | Lynker | 501/108 |

FOREIGN PATENT DOCUMENTS

| | | |
|---|---|---|
| TW | 200700348 A | 1/2007 |
| WO | 2009/011792 A1 | 1/2009 |

* cited by examiner

LARGE REFRACTORY ARTICLE AND METHOD FOR MAKING

CLAIMING BENEFIT OF PRIOR FILED U.S. APPLICATION

This is a divisional of U.S. patent application Ser. No. 12/704,897 filed on Feb. 12, 2010, now abandoned which claims the benefit of U.S. Provisional Application Ser. No. 61/153,679, filed on Feb. 19, 2009. The content of this document and the entire disclosure of publications, patents, and patent documents mentioned herein are incorporated by reference.

BACKGROUND OF THE INVENTION

1. Field of the Invention

This invention is directed to a method of making a large refractory article, and in particular, large refractory blocks or forming bodies, such as an isopipe used in the manufacture of glass.

2. Technical Background

Large refractory articles (e.g. blocks) are often used in the manufacture of glass due to their superior resistance to the high temperatures experienced in the process, and the harsh chemical nature of molten glass. These articles are typically formed by first forming a green refractory body, then heating, or firing, the green body to drive off any moisture, burn off organic binders that might be present, and densify the body by causing individual particles comprising the body to coalesce. This densification is accompanied by shrinking or contraction of the body, wherein the final sintered article is smaller than the original green body (e.g. the length of the article decreases).

The frictional forces between a small green body and the structure supporting the green body within the furnace or kiln are not so great that excessive stress is introduced into the body during the shrinkage of the body. However, for large bodies, frictional forces can create large stress in the body. In some applications, the final sintered article is massive (e.g. having a mass in excess of 450 kg), and frictional forces can result in induced stresses that can fracture the body, either during the sintering, or later when the sintered article is used. For sintered articles having a mass much larger than 450 kg, the ability to sinter the precursor green body is significantly compromised, i.e. there is a increasing tendency for the sintering to produce cracks in the body. Thus, there is a need for a method of making large refractory bodies that can accommodate large contractions of the body during the sintering process and does not induce high stresses in the body or the resultant sintered article than can produce cracks or other stress-related flaws.

SUMMARY

Various methods are disclosed herein for forming a large, sintered refractory article, such as, for example, a monolithic (single piece) sintered refractory article.

In one embodiment, a sintered refractory article is described comprising a mass greater than 450 kg, a porosity less than 20% and a length greater than 250 cm. Preferably, the sintered refractory article is an isostatically pressed refractory article. Preferably, the sintered refractory article is a monolithic article. In some embodiments, the refractory article has a porosity less than 15%. In certain other embodiments, the refractory article has a porosity less than 10%. The mass in some instances can be greater than 1000 kg. The refractory article may comprise a trough, and forming surfaces that converge at a root, such as an isopipe used in the manufacture of glass, and in particular glass sheet. The refractory article may, for example, comprise zircon or xenotime.

In another embodiment, a method of making a glass sheet is disclosed comprising heating a batch material in a furnace to produce a molten glass, flowing the molten glass over converging forming surfaces of a refractory body to form the glass sheet (12) and wherein the refractory body has a mass greater than 450 kg and a length greater than 250 cm. The mass of the refractory body may, for example, be greater than 1000 kg. In some embodiments, the refractory body may comprise zircon or xenotime, or a combination thereof.

In another embodiment, a method of forming a sintered refractory article is described, comprising positioning a green refractory body on a plurality of support plates separated by gaps, wherein the support plates are supported by a plurality of support members. The green refractory body may comprise zirconium silicate for example, wherein the sintered refractory article comprises zircon. The sintered refractory article may comprise xenotime. Preferably, a joint material is disposed in the gaps between adjacent support plates. Each of the support members includes an arcuate upper surface having a constant radius of curvature and an arcuate lower surface also having a constant radius of curvature. Preferably, the radius of curvature of the arcuate upper surface is equal to the radius of curvature of the arcuate lower surface. For example, a radius of curvature of the upper and lower arcuate surfaces is preferably at least 30 cm. Preferably, a center of gravity of each support member is displaced from the support member center of rotation. In some instances a layer of setter material is disposed between the green refractory body and the support plates. The green refractory body is then heated to form a sintered refractory article. During the heating the green refractory body contracts. This causes the support plates to translate in response to the green refractory body contraction, and the support members rotate in response to the translation of the support plates.

The method is particularly useful for the production of relatively large refractory bodies, such as those wherein the longest dimension of the sintered refractory article is at least about 250 cm and/or a mass of the sintered refractory article is at least about 450 kg.

In still another embodiment a method of forming a sintered refractory article is described, comprising positioning a green refractory body weighing at least 450 kg. on a plurality of support plates, wherein the support plates are supported by a plurality of support members and adjacent support plates are separated by gaps, each of the support members being a section of a cylinder. The green refractory body may comprise zirconium silicate for example.

The green refractory body is next heated to form a sintered refractory article. During the heating the green refractory body contracts, causing the support plates to translate in response to the contraction of the green refractory body and the support members to rotate in response to the translation of the support plates.

In yet another embodiment, a method of forming a sintered refractory article, such as isopipe, is described comprising forming a green refractory body by isostatically pressing a powdered refractory material, positioning the green refractory body on a plurality of support plates in a furnace, wherein the support plates are supported by a plurality of support members and adjacent support plates are separated by gaps, each of the support members being a section of a cylinder. The green refractory body is then heated to form a sintered refractory article. During the heating the green refractory body contracts, causing the support plates to translate in response to the contraction of the green refractory body and the support members to rotate in response to the translation of the support plates. The method is particularly effective when producing articles wherein the longest dimension of the sintered refractory article is at least about 250 cm and/or a mass of the sintered refractory article is at least about 450 kg. In some embodiments, the sintered refractory article has a mass greater than 1000 kg. Preferably, a radius of curvature of the upper and lower arcuate surfaces that comprise each support member is at least 30 cm. In some instances a joint material may be disposed in the gaps between adjacent support plates. Preferably, a center of gravity of the support members is displaced from a center of rotation of the support members.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As used herein, the term green refractory body, unless otherwise indicated, refers to an un-sintered refractory body.

As used herein a refractory material is an inorganic, non-metallic material that retains its strength at high temperature. The refractory material may be crystalline, or partially crystalline, e.g. a ceramic material. Accordingly, refractory material as described herein exhibit chemical and physical properties that make the material applicable for structures, or as components of systems, that are exposed to a temperature of at least about 538° C. A refractory body is a body formed from a refractory material. The refractory body may be green (un-sintered) or a sintered refractory article. A green refractory body will be considered green, or un-sintered, until the sintering process has reached conclusion and the body becomes a sintered refractory article. For example, in some applications, the sintering process may be considered complete when the body has reached a porosity (open or closed or a combination thereof) of equal to or less than about 10%. Completion of the sintering process may vary depending upon the final use of the article resulting from the sintering, and must be considered in the context thereof. Generally speaking, the sintering process is complete when the resultant refractory article has reached a density wherein the article capable of being used for its intended purpose, not including any post-sintering processes (e.g. milling, coating etc.) that does not include additional densification.

Glass manufacturing systems often use large refractory blocks, for example as furnace linings. Refractory blocks may be manufactured that exhibit superior resistance to deformation during the glass making process, and can exhibit excellent corrosion resistance, depending on the refractory material or materials selected.

Figure 1:
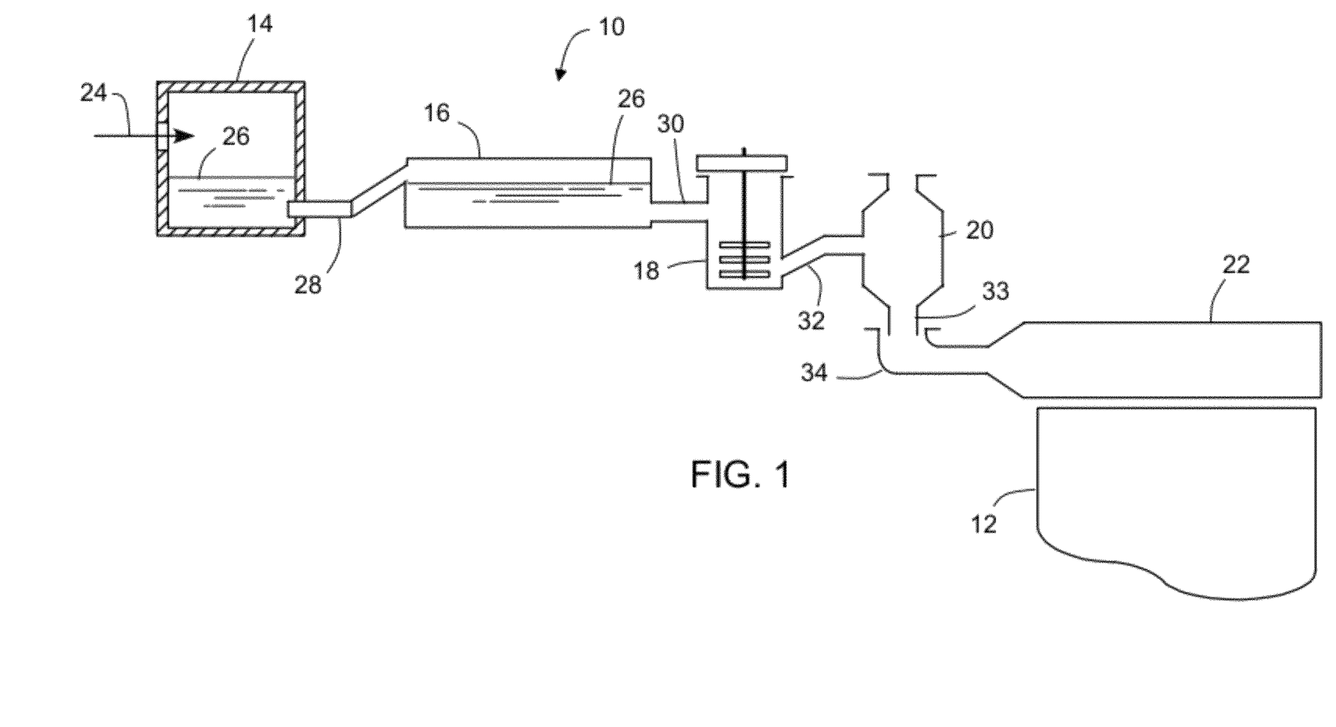
FIG. 1 is a cross sectional side view of an exemplary glass melting system in accordance with an embodiment of the present invention.

One use of large refractory articles in a glass making system is as a forming body in the manufacture of glass sheet. As shown in FIG. 1, an exemplary glass making system 10 is depicted that uses the downdraw fusion process to make glass sheet 12. Glass manufacturing system 10 includes melting vessel 14, fining vessel 16, mixing vessel 18, delivery vessel 20 and forming body 22 (e.g., isopipe 22). Melting vessel 14 is where glass batch materials are introduced as shown by arrow 24 and melted to form molten glass 26. Fining vessel 16 is connected to the melting vessel by melting vessel to finer connecting tube 28. Fining vessel 16 receives molten glass 26 from melting vessel 14 and removes bubbles from the molten glass. Fining vessel 16 is connected to mixing vessel 18 by fining vessel to mixing vessel connecting tube 30. Mixing vessel 18 is connected to delivery vessel 20 by mixing vessel to delivery vessel connecting tube 32. Delivery vessel 20 delivers molten glass 26 through downcomer 33 into inlet 34 and on to forming body 22 (e.g., isopipe 22) which forms glass sheet 12. Forming body 22 comprises a suitable refractory material (e.g. zircon) and is described in greater detail below with respect to FIG. 2.

Figure 2:
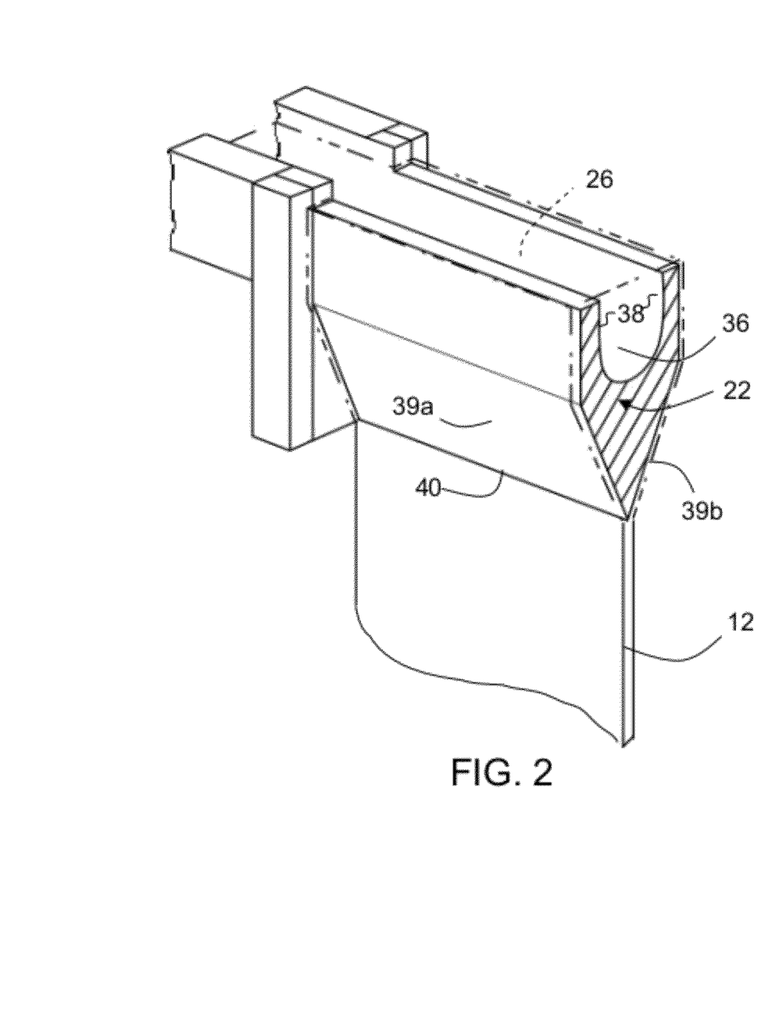
FIG. 2 is a cross sectional side view of an isopipe that may be used in the glass making system of FIG. 1.

Referring to FIG. 2, there is shown a perspective view and partial cross section of an exemplary isopipe 22 (shown with the nearest end removed to show the interior of the isopipe) that may be used in glass manufacturing system 10. Isopipe 22 includes trough 36 that receives molten glass 26. Molten glass 26 fills and overflows walls 38 of trough 36 and runs down as two separate streams along two converging sides 39a and 39b (on the backside of FIG. 2 and not shown) of the isopipe before fusing together at root 40. Root 40 is where the two sides 39a and 39b meet and where the two flows of molten glass flowing down the sides of the isopipe join before being drawn downward and cooled to form glass sheet 12. It should be appreciated that isopipe 22 and glass manufacturing system 10 can have different configurations and components other that those shown in FIGS. 1 and 2 and still be considered within the scope of the present invention In a typical manufacturing process for large refractory bodies of the type that may be used in a fusion downdraw glass making process (e.g. an isopipe), a suitable refractory material or mixture of materials are placed in a compliant bladder, for example a rubber bladder, having a predetermined shape. Typically, the refractory materials are powdered. The bladder may be vibrated as it is filled with the refractory powder to ensure a homogeneous distribution of powder in the bladder. The refractory powder typically might include binders, and be produced, for instance, by forming a slurry of various metal oxides, a binder and a dispersant in water. The refractory powder may, for instance, comprise zircon (zirconium silicate) or xenotime. The slurry may then be spray dried to produce a dry refractory power.

In a following step, the bladder is sealed and placed into a container into which a fluid, such as water, can be injected at high pressure (pressures can be in excess of 1400 kg/cm$^2$). The fluid surrounds the sealed bladder, and applies a uniform pressure against the surface of the bladder, thereby isostatically pressing the bladder and its contents. The high pressure applied to the refractory powder within the bladder causes the refractory powder particles to adhere and form a porous rigid body having a predetermined shape.

When the body has been isostatically pressed for a time sufficient to form a porous body capable of holding its shape under routine process handling (e.g. moving from one location to another), hereinafter the green body or green refractory body. The green refractory body is removed from the bladder and heated for a time and at a temperature sufficient to burn off the binder and sinter the green body into a dense shape having a low porosity, for example, a porosity equal to or less than about 20%, preferably less than about 15% and more preferably less than about 10%. The green refractory body may be heated, for example, in a furnace (e.g. kiln).

It should be understood that the method of forming the green refractory body described supra is but one example. Many methods exist to form a green refractory body and may be used in conjunction with the present disclosure, and the methods described herein should not be considered limiting in this regard.

As the demand for thin glass sheets having ever larger dimensions increases, such as those that may be used in the manufacture of flat panel displays and televisions, the length of the isopipe needed to produce such glass sheets increases accordingly. Isopipe lengths can exceed 250 cm in length, and the isopipe can have a mass of 450 kg or more. For example, very large isopipes can exceed a mass of 500 kg, 600 kg, 700 kg, 800 kg, or 900 kg. In some instances an isopipe can even exceed a mass of 1000 kg. The shear size of such a large, and preferably monolithic (single piece), sintered refractory article presents challenges to its manufacture, not least of which is supporting the green refractory body during the firing or sintering process in such a way that shrinkage or contraction of the body is accommodated without incurring stresses in the body that may lead to cracking, either of the green refractory body, the finally sintered refractory article, or at any stage in between. The following description will be directed to the manufacture of an isopipe as described above, with the understanding that the sintering methods disclosed may be used in the densification of any large refractory body without regard to its end use.

Figure 3:
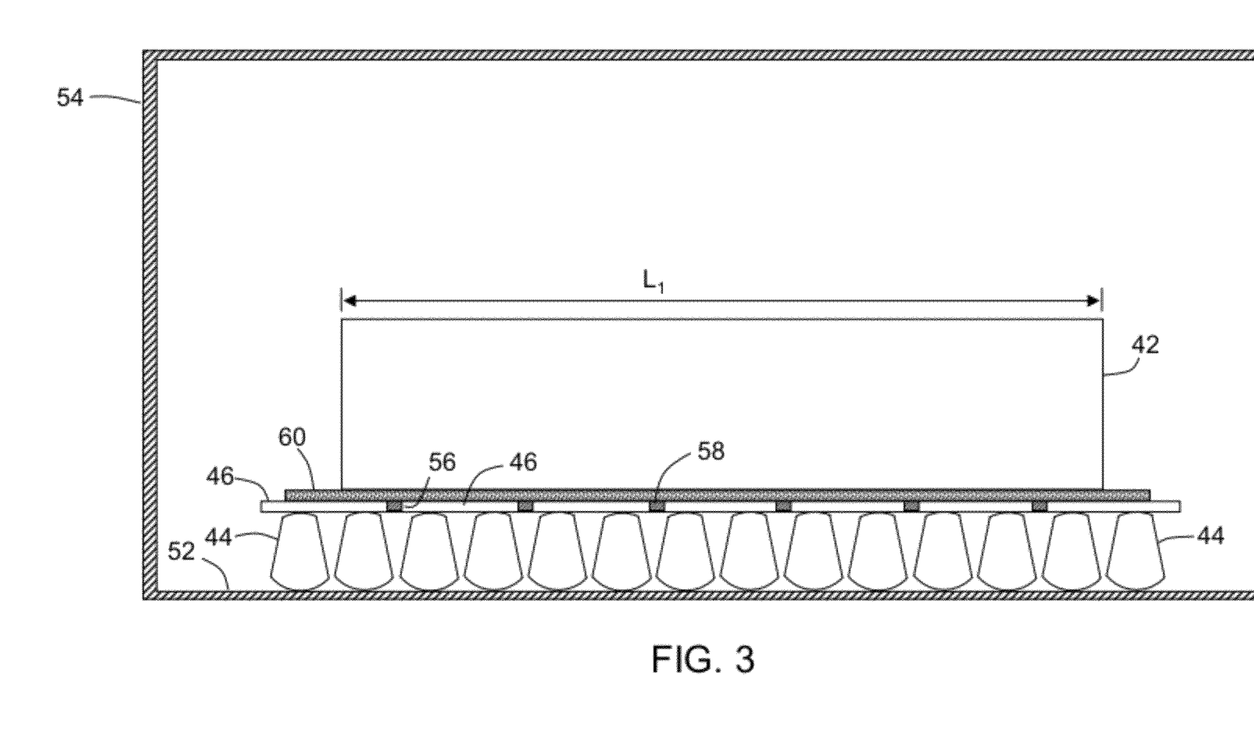
FIG. 3 is a cross sectional side view of an apparatus for sintering a large green refractory body to form a sintered refractory article
Figure 4:
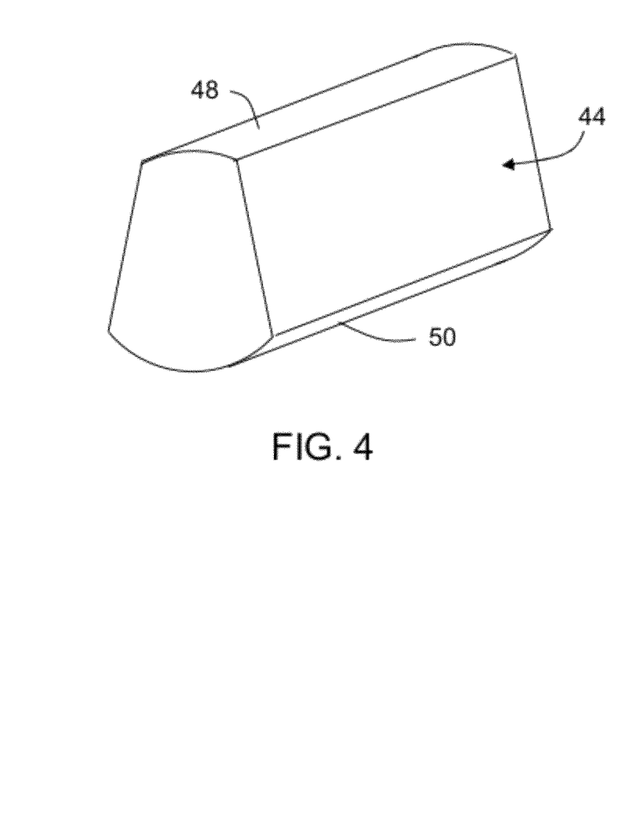
FIG. 4 is a perspective view of a support member.
Figure 5:
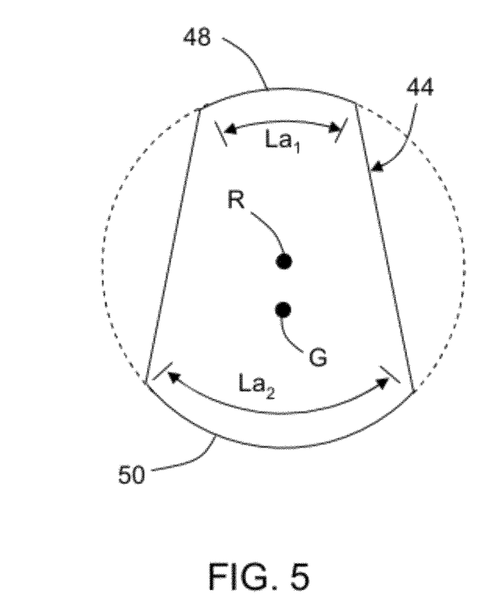
FIG. 5 is a cross sectional view of the support member of FIG. 4 wherein the support member is a section of a cylinder.
Figure 6:
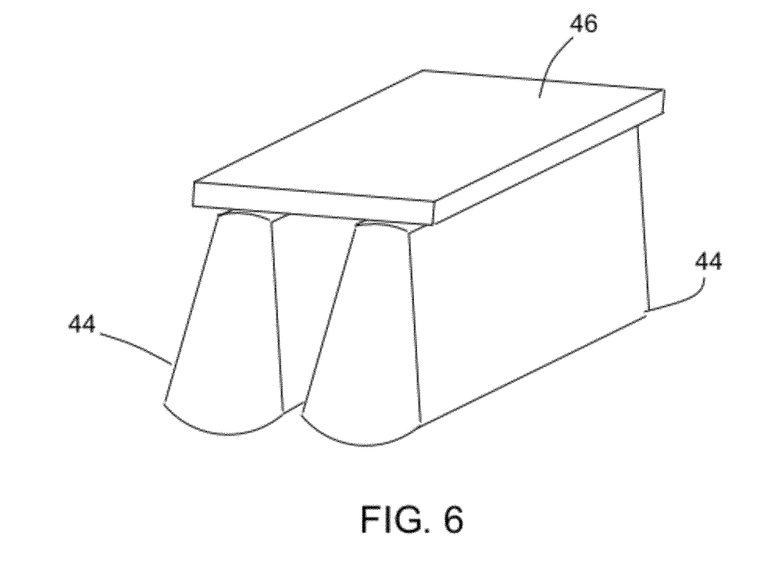
FIG. 6 is a perspective view of two support members according to FIG. 4 supporting a support plate.

Shown in FIG. 3 is a cross sectional view of an embodiment of an apparatus for supporting a large green refractory body 42 comprising a plurality of support members 44, the plurality of support members supporting a plurality of support plates 46. Each support member includes an arcuate upper surface 48 and an arcuate lower surface 50, best seen in FIGS. 4 and 5. Viewed in cross section in FIG. 5, the arcuate upper surface cross section is preferably an arc having a first radius of curvature $r_1$. Similarly, the arcuate lower surface cross section of each support member is preferably an arc having a second radius of curvature $r_2$. Preferably, the radius of curvature of both the upper and lower arcuate surfaces is constant so that cross sections of both the upper and lower arcuate surfaces are arcs of circles having first and second radii of curvature $r_1$ and $r_2$. Ideally, $r_1=r_2$ so that the cross section of a support member comprises sections of a circle, and the dashed lines of FIG. 5, along with the upper and lower arcuate surfaces in solid lines, represent the resultant circle portions. Thus, each support member is preferably a portion of a cylinder having a predetermined radius of curvature $r=r_1=r_2$, and wherein the length $La_1$ of the upper arcuate surface (e.g. the length of the upper surface arc) is shorter than the length $La_2$ of the lower arcuate surface (e.g. the length of the lower surface arc), and the center of gravity G of the support member is closer to the lower arcuate surface than the center of rotation R of the support member. By having a low center of gravity relative to the center of rotation, the support member can be made self-righting, which helps stabilize the structure and aids in loading of the green body.

Support members 44 may be arranged on floor 52 of sintering furnace 54 (e.g. kiln) in parallel rows, with the lower arcuate surface of each support member in contact with sintering furnace floor 52. Support plates 46 are arranged on top of support members 44 such that each support plate 46 is supported by at least two support members. In turn, each support plate 46 is separated from an adjacent support plate by gap 56. Each gap 56 may in turn be filled with a compliant material, hereinafter joint material 58, capable of withstanding the sintering environment without significant degradation. That is, joint material 58 should be capable of accommodating a narrowing of the gap (or conversely a widening of the gap) between adjacent support plates, both as a result of the thermal expansion of the support plates during the sintering process, and movement of the support plates resulting from contraction of the green body during sintering. For example, the joint material may comprise fiber glass, an asbestos wool (although asbestos is not considered preferable due to its health hazards), or an asbestos replacement material that can be formed into a resilient gap filler.

A layer of setter material may optionally be deposited overtop the support plates 46 to produce a compliant bed 60 that resists damage to the green refractory body 42 (or resulting sintered refractory article), and helps to distribute the weight of the green refractory body on the support plates. In addition, the setter material accommodates shrinkage of the green refractory body over the length of an individual support plate. The setter material may be any suitable granular material, or grog, including, but not limited to silica, alumina, high duty fireclay, cordierite or zirconia. Preferably, the granules of the setter material are substantially spherical to promote sliding and thereby reduce friction between the green refractory body and the setter material during contraction of the green refractory body. While the support plates accommodate contraction of the un-sintered body over the plurality of support plates 46, the setter material, when used, aids in accommodating contraction of the body over a single plate. The setter material is prevented from slipping through the gaps between adjacent support plates by the joint material.

As heat is applied to the green refractory body by furnace 54, the individual particles of the green refractory body reach a flow temperature. The particles subsequently coalesce and the body becomes denser. This density increase is accompanied by a shrinking (densification) of the green refractory body that is generally proportional to the dimension of interest of the body. For example, the amount of contraction along the length of the green refractory body is generally proportional to the length. Thus, a point proximate the center of the body may move a small given distance inward toward the center, while a point located farther from the center will move a farther distance relative to the center, since the movement of the other particles between the distant particle and the center particle must also be added. For large green bodies being considered here, for example, those having a length greater than about 250 cm and a weight in excess of 450 kg, the body may contract by 30 cm or more at its extremes. Looked at a different way, assuming the center of the body remains stationary, each end of the body moves 15 cm. toward the center of the body and the body overall contracts by a total of 30 cm. Overall changes in length will vary depending, inter alia, on the material comprising the body and the degree of densification.

Figure 7:
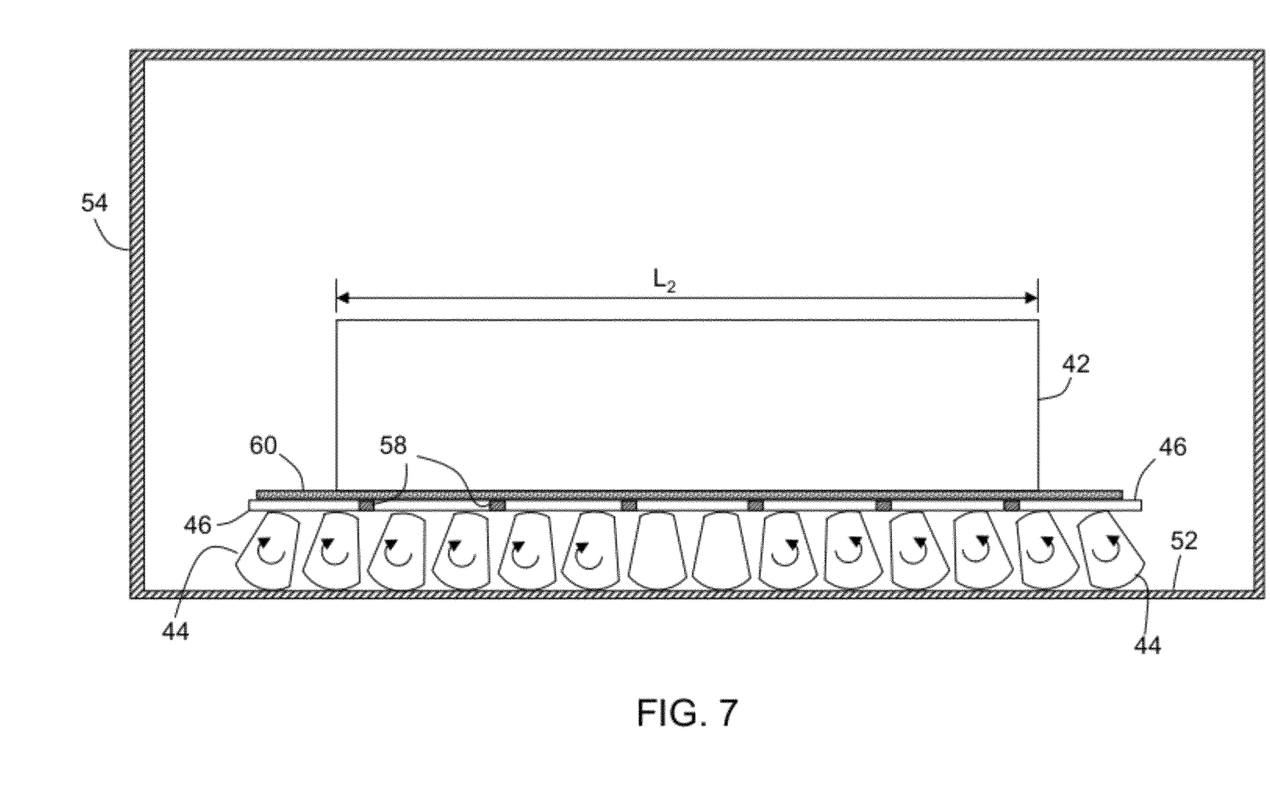
FIG. 7 is a cross sectional side view of a sintered refractory article after completion of the sintering process in the apparatus of FIG. 3, showing the rotation of the supporting members.

To accommodate the change in length of the green body as it is transformed from a first density to a second sintered density greater than the first density and from a first length $L_1$ to a second sintered length $L_2$ (see FIG. 7) less than $L_1$, the support plates are pulled inward (the plates translate inward toward the center of the body). This inward movement is transmitted to the support members through the support plates, causing the support members to rotate toward the center of the body. If the support members have a constant radius of curvature for both the upper arcuate surface and the lower arcuate surface, and if the radius of curvature for the upper arcuate surface 48 is equal to the radius of curvature for the lower arcuate surface 50, the support plate will translate inward toward the center of the body without undergoing a change in vertical displacement. More simply put, each support plate will move inward a certain distance according to its position along the length of the body, but will not change its vertical height above the floor of the furnace. Thus, the sintering body does not experience stress from uneven support plates (unevenness from one plate to another along the length of the body). This may be more easily understood if one envisions each support member as being a cylinder. In the instance of a support plate being supported by two cylinders, the support plate can be translated in a direction perpendicular to the length of the cylinder, with the cylinders rolling beneath the support plate. Because the radius of curvature of each cylinder is constant, the height of the support plate above the surface over which the cylinders roll, the height of the support plate above the supporting furnace floor does not change (unless the surface over which the cylinders roll changes height). In some embodiments, the support members may be cylinders, but extra care must be taken to prevent unwanted rotation of the support members (e.g. by placing a layer of setter material on the furnace floor).

It should be noted that contraction of the green refractory body at the center of the body, and proximate the center of the body is minimal, and therefore there is little movement of the support plate beneath the center or of the green refractory body over the support plate. Thus, the center of the body may, if desired, be supported by a stationary support, such as a pillar, table, or other suitable supporting structure that does not need to translate or rotate.

Once the green refractory body has been placed in the furnace and positioned on the supporting structure (e.g. support plates, support members and setter material), the furnace is heated to a temperature or temperatures suitable for sintering the body according to a heating schedule appropriate for the particular body. Upon completion of the sintering process, the furnace may be cooled according to a predetermined cooling schedule, and the sintered refractory article removed from the furnace. The sintered refractory article can have a mass of 500 kg, 600 kg, 700 kg, 800 kg, or 900 kg. In some instances the sintered refractory article can even exceed a mass of 1000 kg. Post-sintering processing may be carried out according to the nature and use of the article. For example, additional machining of the article may be undertaken (drilling, grinding etc.) as necessary. Additional machining may be performed, for example, to produce a forming body (e.g. isopipe) for the manufacture of glass (e.g. glass sheet).

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of forming a sintered refractory article, comprising:
    positioning a green refractory body on a plurality of support plates separated by gaps, wherein the support plates are supported by a plurality of support members, each of the support members having an arcuate upper surface of constant radius of curvature and an arcuate lower surface of constant radius of curvature, the radius of curvature of the arcuate upper surface is equal to the radius of curvature of the arcuate lower surface, and each of the support members having a center of gravity displaced from a center of rotation of the support member, there being a layer of setter material disposed between the green refractory body and the support plates;
    heating the green refractory body to form a sintered refractory article; and
    wherein during the heating the green refractory body contracts, causing the support plates to translate in response to the contraction of the green refractory body and the support members to rotate in response to the translation of the support plates.

2. The method according to claim 1, wherein a longest dimension of the sintered refractory article is at least about 250 cm.

3. The method according to claim 1, wherein the green refractory body was formed by isostatically pressing a refractory material.

4. The method according to claim 1, wherein a radius of curvature of the upper and lower arcuate surfaces is at least 30 cm.

5. The method according to any of claims 1, wherein a joint material is disposed in the gaps between adjacent support plates.

6. The method according to claim 1, wherein the sintered refractory article is an isopipe.

7. The method according to claim 1, wherein the sintered refractory article comprises zircon or xenotime.

8. The method of claim 1, wherein a length $La_1$ of the upper arcuate surface is less than a length $La_2$ of the lower arcuate surface.

9. The method of claim 1, wherein the center of gravity of each support member is closer to the lower arcuate surface than the center of rotation of each support member.

10. The method of claim 1, wherein a gap between adjacent support plates is filled with a compliant material.

11. The method of claim 10, wherein the compliant material comprises fiber glass.

12. The method of claim 1, wherein the setter material is formed from a material selected from the list consisting of silica, alumina, high duty fireclay, cordierite and zirconia.

13. The method of claim 1, wherein the setter material comprises granules which are substantially spherical.

14. The method of claim 1, wherein the plurality of support members are arranged in parallel rows.

15. The method of claim 1, wherein the plurality of support plates are positioned on top of the plurality of support members such that each support plate is supported by at least two support members.

16. A method of forming a sintered refractory article, comprising:
   positioning a green refractory body on a plurality of support plates in a furnace, wherein the support plates are supported by a plurality of support members and adjacent support plates are separated by gaps, each of the support members being a portion of a cylinder and having a center of gravity displaced from a center of rotation of the support member;
   heating the green refractory body in the furnace to form a sintered refractory article; and
   wherein the green refractory body contracts during the heating, causing the support plates to translate in response to the contraction of the green refractory body and the support members to rotate in response to the translation of the support plates.

17. The method of claim 16, further comprising a layer of setter material deposited overtop of the plurality of support plates.

18. The method of claim 17, wherein the setter material comprises granules which are substantially spherical.

19. The method of claim 16, wherein the center of gravity of each support member is closer to a lower arcuate surface of each support member than the center of rotation of each support member.

20. The method of claim 16, wherein a length $La_1$ of an upper arcuate surface of each support member is less than a length $La_2$ of a lower arcuate surface of each support member.

21. The method of claim 16, wherein a gap between adjacent support plates is filled with a compliant material.

* * * * *